United States Patent
Septembre

(10) Patent No.: US 7,180,834 B2
(45) Date of Patent: Feb. 20, 2007

(54) APPARATUS AND METHODS FOR DIGITAL DATA RECORDING

(75) Inventor: Samuel L. Septembre, Havertown, PA (US)

(73) Assignee: The Boeing Company, Chicago, IL (US)

(*) Notice: Subject to any disclaimer, the term of this patent is extended or adjusted under 35 U.S.C. 154(b) by 574 days.

(21) Appl. No.: 10/337,095

(22) Filed: Jan. 6, 2003

(65) Prior Publication Data

US 2004/0130979 A1 Jul. 8, 2004

(51) Int. Cl.
*G11B 7/00* (2006.01)

(52) U.S. Cl. .............. 369/44.26; 369/109.1; 369/109.2; 369/275.4

(58) Field of Classification Search .......... 369/44.26, 369/109.01, 109.02, 275.4
See application file for complete search history.

(56) References Cited

U.S. PATENT DOCUMENTS

| | | | | |
|---|---|---|---|---|
| 4,674,070 A | * | 6/1987 | Tajima et al. | 369/44.37 |
| 5,339,304 A | * | 8/1994 | Hanaoka | 369/109.02 |
| 5,572,508 A | * | 11/1996 | Satoh et al. | 369/44.26 |
| 6,226,241 B1 | | 5/2001 | D'Amato et al. | 369/47.15 |
| 6,879,556 B2 | | 4/2005 | Thomas, III | |

OTHER PUBLICATIONS

Brian, M., *How CDs work*, http://www.howstuffworks.com/cd.htm/printable, (1998-2002), Accessed May 20, 2002, 6 pgs.
Nice, K., *How DVDs and DVD players work*, http://howstuffworks.com/dvd.htm/printable, (2000), Accessed May 20, 2002, 18 pgs.
*An introduction to compact discs*, http://www.gi.alaska.edu/crc/cdrom/cdrom.html, Accessed Aug. 5, 2002, 4 pgs.
*InPhase Technologies: Technologies: what is holographic storage?*, http://www.inphase-technologies.com/technology/, Accessed Aug. 8, 2002, 3 pgs.
*Managing multimedia*, Managing Multimedia Edition 3, Book 2, Ch. 5, CD Formats, http://www.atsf.com.uk/manmult/ch_205_colbooks.html, Accessed Aug. 5, 2002, 3 pgs.

* cited by examiner

*Primary Examiner*—Tan Dinh
*Assistant Examiner*—Adam R. Giesy
(74) *Attorney, Agent, or Firm*—Harness, Dickey & Pierce, P.L.C.

(57) ABSTRACT

An apparatus for holding digital data. The apparatus includes a medium in which a plurality of dimples are spaced for tracking by a playing apparatus. Each dimple includes a plurality of facets, and each facet represents a data bit. Because the location of each dimple is predetermined, a tracking assembly can use the dimple locations for tracking purposes. Thus there is no need to reserve bits for tracking purposes, and more data can be stored in a given space on a given medium than with previously developed high-density digital storage media.

36 Claims, 3 Drawing Sheets

APPARATUS AND METHODS FOR DIGITAL DATA RECORDING

FIELD OF THE INVENTION

The present invention relates generally to data recording and, more particularly, to data recording on media such as compact discs and digital versatile discs.

BACKGROUND OF THE INVENTION

Commercial compact discs (CDs) typically are recorded by impressing microscopic rectangular bumps in a clear polycarbonate plastic disc. The bumps are arranged as a single, continuous long spiral track of data circling from the center of the disk to the outside edge. The bumps are about 0.5 micrometers wide, at least 0.83 microns long and 125 nanometers high. A thin reflective coat of aluminum is sputtered onto the bumps, and an acrylic protective layer then is sprayed over the aluminum. A label is printed onto the acrylic layer.

Whereas commercially recorded CDs are stamped with data, CD-recordable (CD-R) discs can be "burned", that is, written upon by a laser. A CD-R typically has a reflective surface coated by a translucent, optically active dye. During recording, the laser causes the dye to react and form opaque spots on the reflective surface.

Like CDs, digital versatile disks (DVDs) hold data that is encoded as lands and bumps along a track. DVDs typically are of the same size as CDs, but can hold two layers of data along a track. An inner data layer typically is sputtered with reflective aluminum, and an outer layer can be sputtered with semi-reflective gold. The inner layer can be read using a laser that penetrates the gold layer. A DVD can hold recorded data on each of its sides and thus can hold about seven times more data than can a CD.

When a CD, CD-R or DVD is played on a disc player, a laser beam follows a data track on the disc as the disc spins. The laser beam passes through a clear plastic layer of the disc and strikes a reflective layer. In the case of a CD or DVD, the laser strikes reflective bumps and low areas (lands) between the bumps. When a CD-R disc is played, the laser strikes reflective and opaque spots along the track. An opto-electronic sensor detects reflections of the laser. The reflections vary between lands and bumps (or, in the case of a CD-R disc, between reflective and opaque spots), and are interpreted by a processor as "1" or "0".

It has become common to store data-intensive multimedia content on disc, thus making it desirable to provide as much storage capacity as possible on such devices. DVD technology provides a significant increase in data storage capacity over CDs and CD-Rs. Like CDs and CD-Rs, however, DVDs are limited by the fact that data bits are recorded in a linear fashion along a track. Current disc formats also reserve a significant number of data bits (for example, every eighth bit) for use by a tracking system as "locate" bits, thus precluding the bits from being used for data storage.

SUMMARY OF THE INVENTION

The present invention, in one preferred embodiment, is directed to an apparatus for holding digital data adapted to be read by a device. The apparatus includes a medium in which a plurality of dimples are spaced for tracking by the device. The medium includes a plurality of facets defining one of the dimples, each facet representing a data bit.

In another preferred embodiment, an apparatus for digitally recording data includes a medium in which a plurality of dimples are arranged in a pattern for tracking by a playing apparatus, each dimple defined by a plurality of facets in the medium, and a recording device that selectively varies a reflectivity of at least one facet surface to indicate a bit value to a playing apparatus.

In another preferred embodiment, a recording device for digitally recording data in a plastic medium is configured to form a plurality of dimples in the medium, wherein each dimple is defined by a plurality of facets, each facet representing a data bit value. The recording device is further configured to arrange the dimples in a pattern for tracking by a playing apparatus.

In another preferred embodiment, the invention is directed to a playing apparatus for playing digital data recorded in a medium in a plurality of dimples spaced for tracking and wherein a dimple is defined in the medium by a plurality of facets, each facet representing a bit of the data. The playing apparatus includes a laser emitter that tracks the dimples. The emitter includes a plurality of conduits configured to emit light essentially simultaneously toward facets of a target dimple, and a plurality of sensors, each sensor configured to sense a reflection of the light by a facet of the target dimple.

A method of recording data bits in a medium such as a disc, according to another preferred embodiment, includes providing a plurality of spaced apart dimples formed in the medium, each dimple including a plurality of facets. The method further includes varying a reflectivity of a facet surface in a dimple to indicate a bit value.

In yet another preferred embodiment, the invention is directed to a method of playing data from a medium such a disc in which data is stored in a plurality of multifaceted dimples spaced apart at predetermined distances on the medium, each of the dimples including a plurality of facets, each facet representing a data bit. The method includes emitting light onto the facets of a target dimple, and determining whether light is reflected off a facet.

Because each dimple can hold more than one bit of data, disc storage capacity can be significantly greater than in the prior art. Additionally, in embodiments in which the location of each dimple is predetermined, a tracking assembly can use the dimple locations for tracking purposes. Thus there is no need to reserve bits for tracking purposes, and more data can be stored in a given space on a given medium than with previously developed high-density storage media.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. Although embodiments of the present invention are described herein in conjunction with compact disks (CDs) and CD-recordable (CD-R) discs, the invention is not so limited. Embodiments also are contemplated in conjunction with digital versatile disks (DVDs) and other media in which multifaceted dimples can be implemented as described below. It also should be noted that embodiments are contemplated in which more than one layer of dimples are provided in a disc. Embodiments also are contemplated in which dimples are provided on two sides of a disc.

Figure 1:
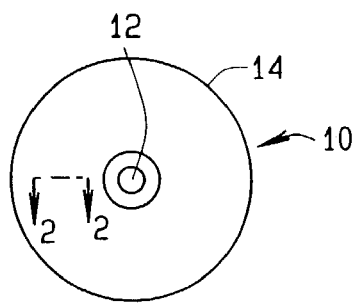
FIG. 1 is a top plan view of a conventional compact disc (CD)
Figure 2:
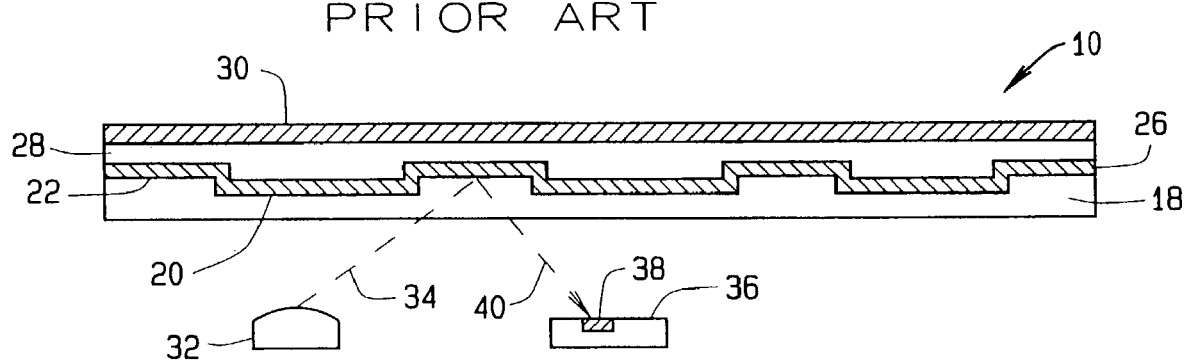
FIG. 2 is a cross-sectional view of the conventional disc, taken along the plane of line 2—2 in FIG. 1, and a laser emitter and sensor.

A conventional compact disc (CD) is indicated generally by reference number 10 in FIG. 1. The disc 10 has a center hole 12 and an outer edge 14. A cross section of the disk 10, taken along the plane of line 2—2 in FIG. 1, is shown in FIG. 2. A plastic layer 18 is molded with a plurality of bumps 20 and lands 22 adjacent the bumps. The bumps 20 and lands 22 indicate bits of data as further described below. The bumps are recorded along a track that spirals from the center hole 12 toward the outer edge 14 of the disc. After the disc is recorded, an aluminum layer 26 is sputtered over the plastic layer 18. An acrylic layer 28, onto which a label 30 is printed, covers the aluminum layer 26.

Figure 3:
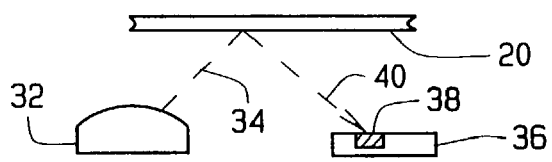
FIG. 3 is a cross-sectional view of a conventional bump and a laser emitter and sensor.
Figure 4:
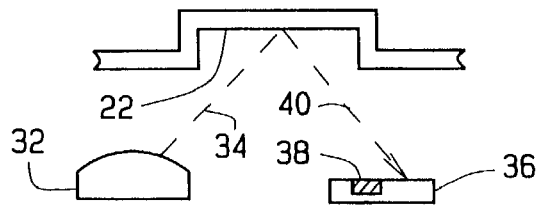
FIG. 4 is a cross-sectional view of a conventional land and a laser emitter and sensor.

When the disc 10 is played on a CD player, an emitter 32 emits a laser beam 34 toward the disc 10 as the disc spins. A receiver 36 in which a sensor 38 is embedded receives a beam 40 reflected off the disc. The sensor 38 interprets the beam 40 as a "1" or a "0" dependent on where the beam hits the receiver 36. For example, referring to FIG. 3, a beam 40 is interpreted as a "1" when the laser beam 34 hits a bump 20, thus reflecting beam 40 onto the sensor 38. Referring to FIG. 4, a beam 40 is interpreted as a "0" when a laser beam 34 hits a land and beam 40 reflects past the sensor 38. A processor (not shown) receives and interprets a chain of digital data bits read from the disc 10.

A tracking system (not shown) is used to ensure that the laser follows the spiral track on which data has been recorded. To keep the laser moving at appropriate speeds, the tracking system uses bumps read by the laser. For this purpose, when data bits are recorded onto a conventional CD, every eighth bit is coded as a "1" for use as a "locate" bit by the tracking system. Data bits are encoded using eight-fourteen modulation (EFM). In EFM, eight bits of data are converted to fourteen bits, and it is understood that certain of the fourteen bits are to be used as "locate" bits. The CD player then must read fourteen bits of data to construct one eight-bit byte of data.

Figure 5:
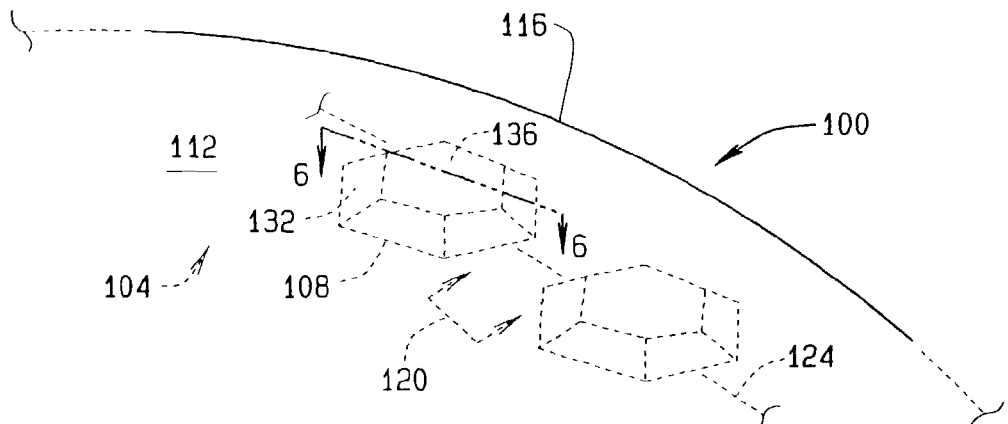
FIG. 5 is a partial perspective view of an apparatus for holding digital data according to one embodiment of the present invention.

An apparatus, for example, a compact disk (CD), for holding digital data in accordance with one embodiment of the present invention is indicated generally by reference number 100 in FIG. 5. The CD 100 is partially shown in FIG. 5 and is not drawn to scale. The disc 100 includes a medium such as an acrylic layer 104 in which a plurality of dimples 108 are spaced for tracking by a playing apparatus (not shown in FIG. 5). The acrylic layer 104 is covered by a label 112. The disc 100 also has an outer edge 116.

As shall be further described below, data is stored in the dimples 108. The dimples 108 are defined in the acrylic layer 104 at predetermined space intervals 120 along a spiral track 124. The track 124 extends, for example, from a center hole (not shown) of the disc 100 to the outer edge 116. A dimple 108 is defined by a plurality of facets, for example, six side facets 132 and a top facet 136, in the acrylic layer 104. Side facets 132 in the present embodiment have the same size and shape, although embodiments are contemplated in which the side facets 132 may differ in shape and/or size. Each facet (132, 136) can be used to represent one data bit. The facets of a dimple can be read essentially simultaneously by a playing device as further described below.

Figure 6:
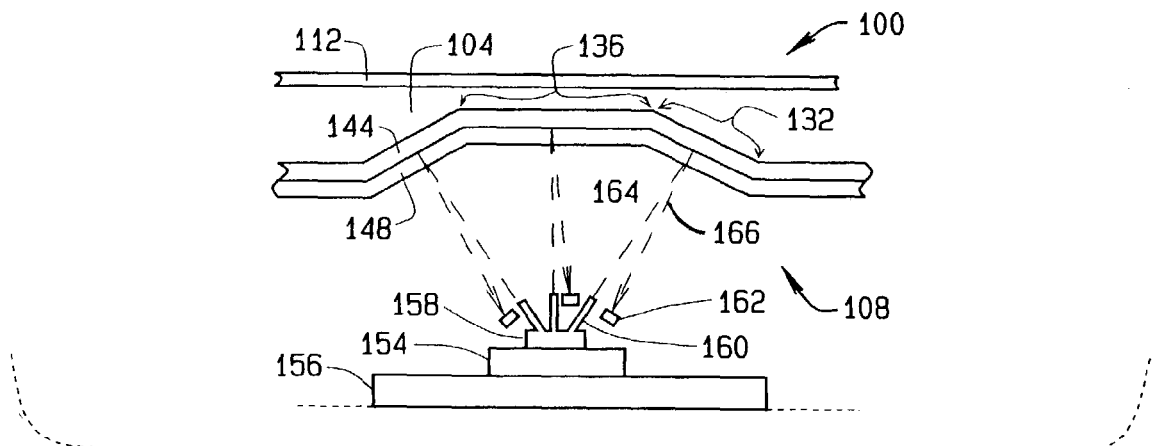
FIG. 6 is a cross-sectional view of the apparatus shown in FIG. 5, taken in the plane of the line 6—6 indicated in FIG. 5, and a playing apparatus according to one preferred embodiment.

A cross sectional view of a dimple 108, taken along the plane of line 6—6 in FIG. 5, is shown in FIG. 6. Each of the facets (132, 136) defining the dimple is coated with a reflective surface, e.g., an aluminum layer 144. The aluminum layer 144 covers a transparent or translucent medium, for example, a clear plastic layer 148. The reflective surfaces 144 shown in FIG. 6 are flat and represent the same bit value, as further described below. Although not shown in FIG. 6, the reflectivity of a surface 144 of a facet may be altered or varied so as to represent a bit value, e.g., a bit value different from that represented by the reflective surfaces shown in FIG. 6.

The disc 100 can be played using a playing apparatus 152. The term "playing" is used in a general sense herein, and includes but is not limited to reading, retrieving, and accessing stored data. A laser system 154 moved by a tracking assembly 156 includes a laser emitter 158 that is used in gathering data from a dimple as further described below. The emitter 158 has seven conduits 160, three of which are shown in FIG. 6. The conduits are made, for example, of optical fiber. Each conduit 160 is associated with a sensor 162.

Data can be read from the dimple 108 in the following manner. As the disc 100 spins, the dimple 108 comes into alignment with the laser emitter 158 as shown in FIG. 6. Each conduit 160 is focused on a corresponding facet (132, 136). Laser beams 164 from the emitter 158 travel through the seven conduits 160 essentially simultaneously. Each of the seven beams 164 penetrates the plastic layer 148 and strikes the reflective surface of a corresponding facet (132, 136) of the dimple.

In the present embodiment, a beam 166 is reflected by each facet (132, 136). Each reflected beam either strikes or misses the sensor 162 associated with the facet. Each of the three reflected beams 166 shown in FIG. 6 hits its associated sensor 162. Receivers (not shown) interpret output of the three sensors 162 shown in FIG. 6 in the same way, e.g., as indicating "1" bits. (Of course, output of the sensors alternatively could be interpreted as "0" bits, depending on what convention is used for encoding data.) Although not shown in FIG. 6, each of the beams reflected by the other four facets (132, 136) is interpreted as a "1" or "0" bit, depending on whether a reflected beam strikes or misses an associated sensor 162. The tracking assembly 156 uses the predetermined space intervals between dimples 108 to track the dimples 108 for reading. A processor (not shown) receives and interprets a chain of digital data bits read from the dimples 108.

Figure 7:
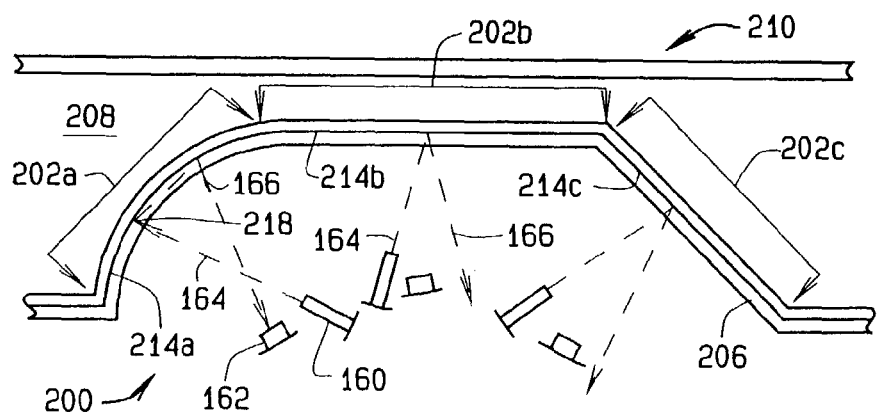
FIG. 7 is a cross-sectional view of a dimple and playing apparatus according to one preferred embodiment.

Another embodiment of a dimple is indicated generally by reference number 200 in FIG. 7. The dimple 200 is defined by a plurality of facets 202 in a clear plastic layer 206 and in an acrylic layer 208 of a disc 210. The facets in the dimple 200 have reflective aluminum surfaces 214. Three facets 202a, 202b and 202c are shown in FIG. 7. The facet 202a has a curved reflective surface 214a. The facets 202b and 202c have flat reflective surfaces 214. Data is recorded in the facets 202b and 202c as, e.g., "0" bits. Laser beams 164 from the playing apparatus 152 strike the facets 202b and 202c, and reflected beams 166 miss the associated sensors 162. Data is recorded, e.g., as a "1" bit in the facet 202a. The curved reflective surface 214a reflects a beam 164 from a conduit 160 to a spot 218 on the surface 214a, from which a beam 166 is reflected onto the associated sensor 162.

Figure 8:
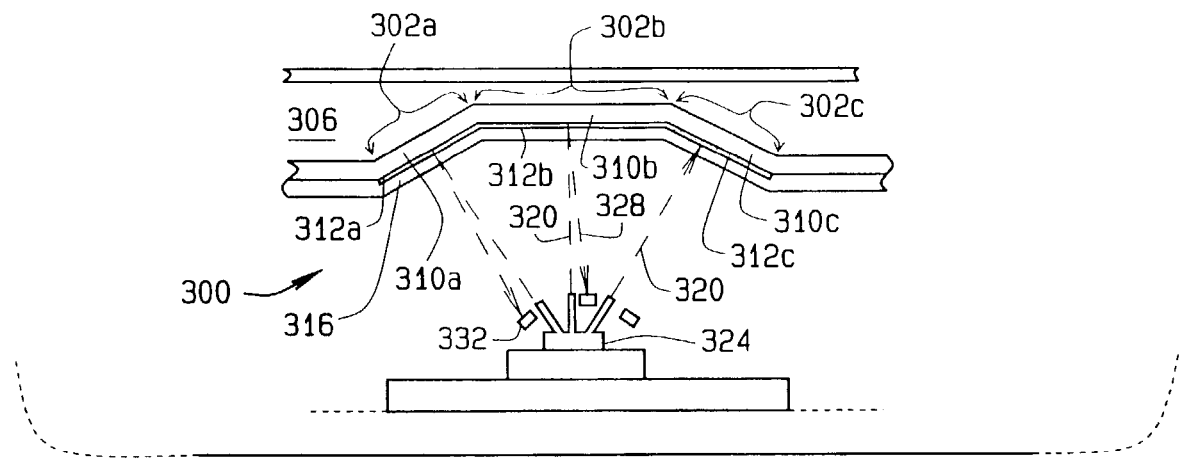
FIG. 8 is a cross-sectional view of a dimple and playing apparatus according to one preferred embodiment.

Another embodiment of a dimple is indicated generally by reference number 300 in FIG. 8. The dimple 300 is defined by a plurality of facets 302 in an acrylic layer 306 of a CD-R disc. Three facets 302 are shown in FIG. 8. Each facet includes a reflective gold layer 310 coated with a layer 312 of dye that is translucent until heated. The dye layers 312 over reflective surfaces 310a and 310b are unheated. The dye layer 312c over the reflective surface 310c is rendered opaque by laser heating.

The dye layer 312 is adjacent a clear plastic layer 316. Data is recorded in the facets 302a and 302b as, e.g., "1" bits. Specifically, beams 320 from a playing apparatus emitter 324 penetrate the dye layers 312a and 312b and reach the gold layer 310. Reflected beams 328 strike playing apparatus sensors 332. Data is recorded, e.g., as a "0" bit in the facet 302c. Specifically, a beam 320 from the emitter 324 strikes and is essentially absorbed by the dye layer 312c. Because the reflective surface 310c is rendered opaque, reflection (if any) from the surface 310c is not sufficiently intense to cause a receiver to interpret any associated sensor output as indicative of a "1" bit value.

Figure 9:
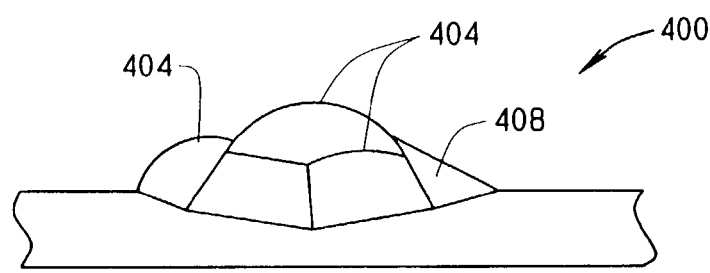
FIG. 9 is an embodiment of a mold.

It can be seen that an apparatus for digitally recording data relative to the foregoing embodiments would selectively vary the reflectivity of a surface of a facet for indicating a data bit value to a playing apparatus. Specifically and for example, an embodiment of a recording device is indicated generally by reference number 400 in FIG. 9. The mold 400 is partially shown in cross-section and is not necessarily drawn to scale. The mold 400 includes, for example, a plurality of nodules 404 and flats 408 corresponding to curved and flat surfaces to be recorded in a facet in a recording medium. The mold can be used for injection-molding a polycarbonate plastic layer such as the plastic layer 148 (shown in FIG. 6). An aluminum or other reflective coating then is sprayed or otherwise applied to the facets. Acrylic is applied over the reflective coating.

Figure 10:
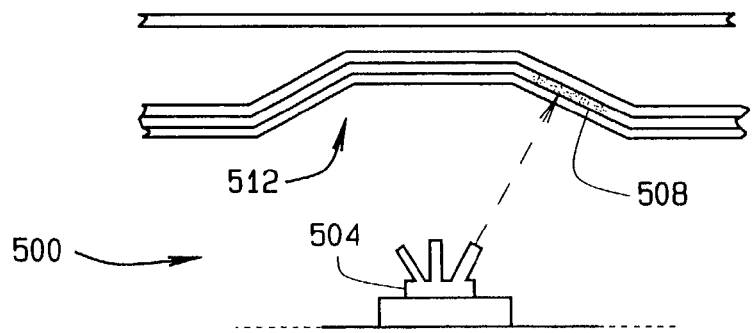
FIG. 10 is a simplified side view of an embodiment of a recording device of the present invention.

Another embodiment of a recording device is indicated generally by reference number 500 in FIG. 10. The device 500 includes a laser emitter 504 that selectively heats a dye layer 508 in a multifaceted dimple 512, for example, in a CD-R disc.

Each dimple in the foregoing embodiments can hold seven bits of data, although embodiments are contemplated having other pluralities of facets in a dimple. When data is recorded and read using EFM in seven-facet dimples, one eight-bit byte can be stored on and retrieved from two dimples. Thus disc storage capacity, most notably in embodiments having multiple layers of dimples, is significantly greater than in the prior art. In embodiments in which the location of each dimple is predetermined, a tracking assembly can use the dimple locations for tracking purposes. Thus there is no need to reserve, for example, every eighth bit for tracking purposes as in the prior art.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus for holding digital data adapted to be read by a device, the apparatus comprising:
   a medium in which a plurality of dimples are spaced apart by predetermined space intervals for tracking by the device;
   each dimple defined by a plurality of facets, each facet representing a data bit.

2. The apparatus of claim 1, wherein the facets are configured to be sensed essentially simultaneously by a playing apparatus.

3. The apparatus of claim 1, wherein at least one of said facets comprises a reflective surface.

4. The apparatus of claim 3, wherein the reflective surface is configured to reflect a laser onto a sensor of the device.

5. The apparatus of claim 3, wherein the reflective surface is configured to reflect a laser away from a sensor of the device.

6. The apparatus of claim 3, wherein the reflective surface comprises a curvature.

7. The apparatus of claim 3, wherein the reflective surface comprises a flat surface.

8. The apparatus of claim 3, wherein the reflective surface is rendered opaque.

9. The apparatus of claim 1, wherein the plurality of facets defining one of the dimples comprises seven facets.

10. The apparatus of claim 9, wherein the seven facets comprise six side facets and a top facet.

11. The apparatus of claim 1, wherein said apparatus is further configured to hold data recorded using eight-fourteen modulation.

12. The apparatus of claim 1, wherein said dimples are spaced apart by predetermined distances.

13. An apparatus for digitally recording data, the apparatus comprising:
   a medium in which a plurality of dimples are arranged in a pattern for tracking by a playing apparatus, each dimple defined by a plurality of facets in the medium, the pattern comprising space intervals in the medium that separate the dimples from one another; and
   a recording device that selectively varies a reflectivity of at least one facet surface to indicate a bit value to a playing apparatus.

14. The apparatus of claim 13, wherein the recording device comprises a laser.

15. The apparatus of claim 13, wherein the recording device selectively configures a facet using eight-fourteen modulation.

16. The apparatus of claim 13, wherein the plurality of facets defining a dimple are configured to be sensed essentially simultaneously by said playing apparatus.

17. The apparatus of claim 13, wherein the plurality of facets defining a dimple comprises seven facets.

18. A recording device for digitally recording data in a plastic medium, the recording device configured to form a plurality of dimples in the medium, wherein each dimple is defined by a plurality of facets, each facet representing a data bit value, the recording device further configured to arrange the dimples in a pattern wherein the dimples are spaced apart from one another in the medium for tracking by a playing apparatus.

19. The recording device of claim 18, further configured to vary a reflectivity of a facet surface.

20. A playing apparatus for playing digital data recorded in a medium in a plurality of dimples spaced apart from one another in the medium for tracking and wherein a dimple is defined in the medium by a plurality of facets, each facet representing a bit of the data, the playing apparatus comprising:
    a laser emitter that tracks the dimples, the emitter comprising a plurality of conduits configured to emit light essentially simultaneously toward facets of a target dimple; and
    a plurality of sensors, each sensor configured to sense a reflection of said light by a facet of the target dimple.

21. The playing apparatus of claim 20, wherein the dimples are spaced apart by predetermined distances, the playing apparatus further configured to track the dimples using the predetermined distances.

22. The playing apparatus of claim 20, wherein the plurality of conduits comprises seven conduits.

23. The playing apparatus of claim 20, wherein the plurality of sensors comprises seven sensors.

24. The playing apparatus of claim 20, further configured to interpret an absence of reflection by a facet as a data bit.

25. The playing apparatus of claim 20, further configured to interpret fourteen data bits as one data byte.

26. The playing apparatus of claim 20, further configured to sense the facets of a dimple essentially simultaneously.

27. A method of recording data bits in a medium such as a disc, the method comprising:
    providing a plurality of dimples formed in the medium and spaced apart at predetermined distances, each said dimple including a plurality of facets; and
    varying a reflectivity of a facet surface in a dimple to indicate a bit value.

28. The method of claim 27, further comprising spacing the dimples apart by distances predetermined to facilitate tracking by a playing apparatus.

29. The method of claim 27, wherein varying a reflectivity comprises making a surface of the facet opaque.

30. The method of claim 27, wherein varying a reflectivity comprises curving a surface of the facet.

31. The method of claim 30, further comprising providing a reflective surface on the curved surface.

32. The method of claim 27, wherein varying a reflectivity comprises rendering the surface opaque.

33. A method of playing data from a medium such as a disc in which data is stored in a plurality of multifaceted dimples spaced apart at predetermined distances on said medium, each of said dimples including a plurality of facets, each said facet representing a data bit, the method comprising:
    emitting light onto the facets of a target dimple; and
    determining whether light is reflected off a facet.

34. The method of claim 33, further comprising tracking the dimples using the predetermined distances.

35. The method of claim 33, further comprising interpreting data bits sensed from more than one dimple as a data byte.

36. The method of claim 33, wherein determining is performed essentially simultaneously for the facets of the target dimple.

* * * * *